Patented Aug. 18, 1942

2,293,035

UNITED STATES PATENT OFFICE 2,293,035

DIOCTYL CYANAMIDE

Richard O. Roblin, Jr., Stamford, Conn., assignor to American Cyanamid Company, New York, N. Y., a corporation of Maine No Drawing. Application May 23, 1939, Serial No. 275,215

1 Claim. (Cl. 260—551)

This invention relates to di-n-octyl cyanamide. This compound may be prepared as follows:

Example 6.1 grams of cyanogen chloride are dissolved in 100 cc. of heptane. After cooling the solution to 0°–5° C., 24.1 grams of di-(2-ethyl hexyl)-amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as di-(2-ethyl hexyl) cyanamide.

It is to be understood that the above example is illustrative only.

This new compound is adapted for various uses, more particularly as intermediates, insecticides and plasticizers for natural and synthetic resins.

While the invention has been described with particular reference to a specific embodiment, it is to be understood that it is not to be limited thereto but is to be construed broadly and restricted only by the scope of the claim.

I claim:

As a new compound, di-n-octyl cyanamide.

RICHARD O. ROBLIN, Jr.